(12) United States Patent
Barone et al.

(10) Patent No.: US 8,059,119 B2
(45) Date of Patent: Nov. 15, 2011

(54) METHOD FOR DETECTING BORDER TILES OR BORDER PIXELS OF A PRIMITIVE FOR TILE-BASED RENDERING

(75) Inventors: Massimiliano Barone, Bresso (IT); Danilo Pietro Pau, Sesto San Giovanni (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 980 days.

(21) Appl. No.: 11/951,186

(22) Filed: Dec. 5, 2007

(65) Prior Publication Data

US 2009/0147016 A1    Jun. 11, 2009

(51) Int. Cl.
    *G06T 15/00* (2011.01)
(52) U.S. Cl. ........ 345/419; 345/421; 345/423; 345/427; 345/506; 345/537; 382/199; 382/254; 382/269; 358/457; 358/462; 358/463; 428/47; 428/49
(58) Field of Classification Search ............... 345/419, 345/421, 581, 582, 423, 427, 506, 537; 382/199, 382/254, 269; 358/457, 462, 463; 428/47, 428/49
See application file for complete search history.

(56) References Cited

U.S. PATENT DOCUMENTS

| 6,437,780 | B1 * | 8/2002 | Baltaretu et al. | 345/423 |
| 6,714,196 | B2 * | 3/2004 | McCormack et al. | 345/423 |
| 6,798,410 | B1 * | 9/2004 | Redshaw et al. | 345/427 |
| 6,816,162 | B2 * | 11/2004 | Taneja et al. | 345/537 |
| 7,119,809 | B1 * | 10/2006 | McCabe | 345/506 |
| 7,834,872 | B2 * | 11/2010 | Fenney et al. | 345/421 |

OTHER PUBLICATIONS

Watt, "Fundamentals of Three-dimensional Computer Graphics," Addison-Wesley Publishing Company, Reading, Mass., 1989, pp. 97-113.

* cited by examiner

*Primary Examiner* — Kimbinh T Nguyen
(74) *Attorney, Agent, or Firm* — Lisa K. Jorgenson; Robert Iannucci; Seed IP Law Group PLLC

(57) ABSTRACT

A method detects border tiles or border pixels of a primitive corresponding to an object to be displayed on a display screen. The detecting includes: calculating the number of border tiles or pixels covered by an edge of the primitive; identifying a plurality of vertices that divide the edge in a plurality of segments of equal length; calculating coordinates of the vertices; and associating a tile or pixel with the coordinates of each vertex. The number of vertices for the edge is greater than or equal to the number of border tiles or pixels.

41 Claims, 11 Drawing Sheets

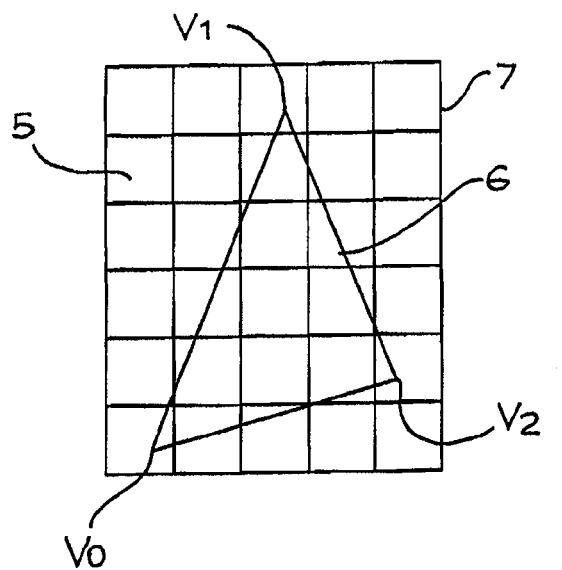
FIG. 7
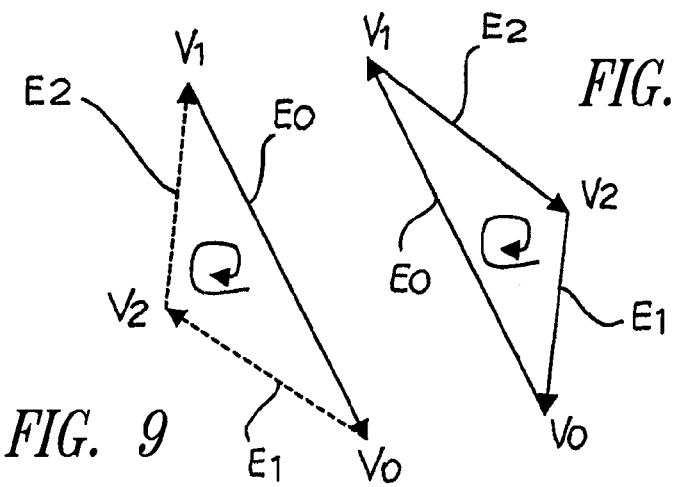
FIG. 8
FIG. 9
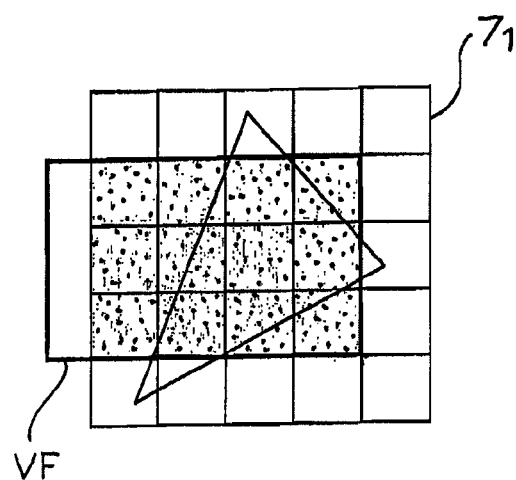
FIG. 5

METHOD FOR DETECTING BORDER TILES OR BORDER PIXELS OF A PRIMITIVE FOR TILE-BASED RENDERING

BACKGROUND

1. Technical Field

The present invention relates to the technical field of graphic rendering and, in particular, to a method for detecting border tiles or border pixels of a primitive in a tile-based rendering system, for example in a sort-middle technique.

2. Description of the Related Art

A virtual three dimensional (3D) model (or simply "3D model") is comprised of primitives in the form of polygons, such as triangles, which represent the skin of the 3D model. A graphic 3D engine draws polygons from the 3D model onto a two-dimensional (2D) surface, such as a screen.

A summary of the prior art rendering process can be found in: "Fundamentals of Three-Dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0.

In a traditional pipeline, the primitives are processed in a submission order. A more efficient method is to break up the frame buffer into individual subsections (tiles) and to render them individually. Each tile includes one or more polygons or, more typically, a portion of one or more polygons.

A tile based rendering employs therefore a way to associate tiles covered by a primitive. A rasterizer renders all primitives of one tile, so which tile is covered by that primitive is found first.

To reduce the amount of tiles that each polygon is assigned to, a primitive or polygon binning method may be used. A polygon binning method excludes tiles that do not include any polygons or portions thereof prior to rasterization. The binning process also accomplishes some rasterization setup by identifying which polygons are contained by each tile.

A simple binning method provides for constructing a bounding box around the primitive. However, many tiles of the bounding box may still be outside the primitive.

According to another approach, the binning method calculates the equations of the lines formed by the edges of the primitive (in the standard y=mx+c format) and then tracks up the lines from vertex to vertex enabling the tiles which are transversed. This (depending on the size of the triangle) may leave some tiles in the middle. These can be checked and enabled by traveling along each row and enabling all tiles which are situated between two previously enabled tiles. This method requires to calculate reciprocal values and has therefore a very high cost.

According to an alternative method, the equations of the lines which form the sides of a polygon are not used and edge equations, which can be derived from a matrix formed by the vertex co-ordinates ("outcode method"), are employed. Therefore, each side of the triangle is associated with an edge equation. Any point on the line will satisfy this equation, with points on one side giving a positive evaluation and on the other a negative result. This property can be used to determine on which side of a line a point is, and therefore, by using three edge equations, whether a point is inside a triangle or not. In the present case, a tile is considered to be covered by a primitive if at least one of its corners is within the triangle. Therefore, this method requires checking against three edge equations for all the corners of the tiles. If all four corners of any tile are outside any of three edges, then that tile can be ignored.

According to another approach, called "midpoint method", triangles are tiled by finding the midpoint of the edges and then disabling blocks of tiles that are outside these points. If a high accuracy is desired, also this method turns out to be quite cumbersome.

There is therefore the need of associating tiles to primitives in a more efficient way, in order to reduce the amount of processing to be performed by the 3D graphic engine.

BRIEF SUMMARY

One embodiment of the present invention provides a method for detecting border tiles or border pixels of a primitive, comprising:

calculating the number of border tiles or border pixels covered by an edge of the primitive;

dividing the edge in a plurality of segments of equal length in such a way the number of vertices defined by said segments is at least equal to the number of border tiles or pixels;

calculating the coordinates of said vertices; and associating a tile or a pixel to the coordinates of each vertex.

BRIEF DESCRIPTION OF THE SEVERAL VIEWS OF THE DRAWINGS

The features and advantages of the method according to various embodiment of the invention will be apparent from the description given below, with reference to the following figures, in which:

FIG. 5 shows an intersection between a frustum and the screen;

FIG. 7 represents a bounding box around a triangle according to one embodiment of the invention;

FIGS. 8 and 9 schematically illustrate the step of determining the coefficients sign of the edge equations according to one embodiment;

DETAILED DESCRIPTION

Figure 1:
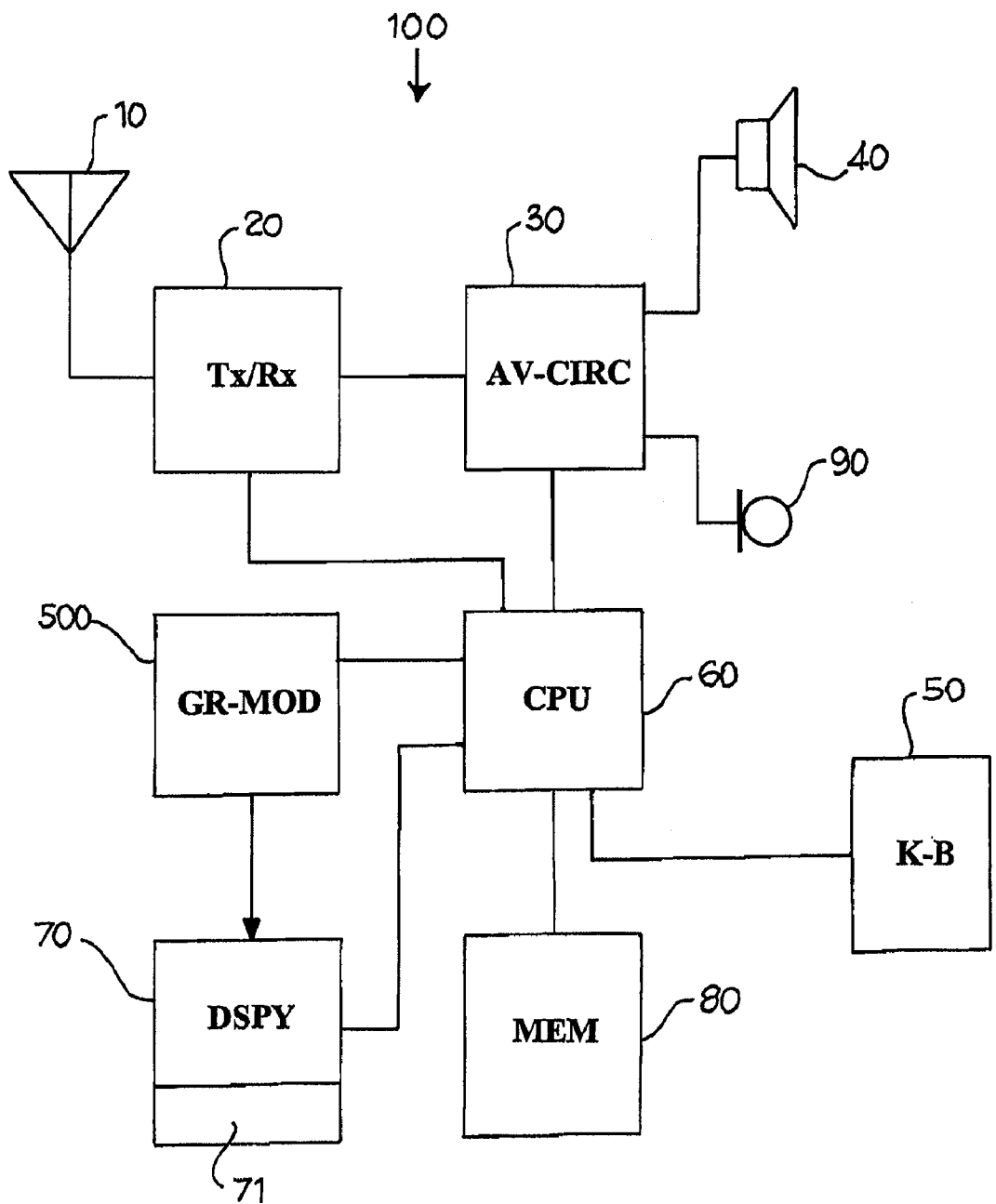
FIG. 1 shows a graphic system in accordance with one embodiment of the invention.

FIG. 1 shows a graphic system according to an embodiment of the invention and comprising a graphic module 500 (GR-MOD). The graphic system 100 illustrated in FIG. 1 is a mobile phone, but in accordance with further embodiments of the invention, graphic system 100 can be another system such as a personal digital assistant (PDA), a computer (e.g., a personal computer), a game console (e.g., PlayStation), etc.

As an example, the mobile phone 100 can be a cellular phone provided with an antenna 10, a transceiver 20 (Tx/Rx) connected with the antenna 10, an audio circuit unit 30 (AV-CIRC) connected with the transceiver 20. A speaker 40 and a microphone 90 are connected with the audio circuit unit 30.

The mobile phone 100 is further provided with a CPU (Central Processing Unit) 60 for controlling various functions and, particularly, the operation of the transceiver 20 and the audio circuit unit 30 according to a control program stored in a system memory 80 (MEM), connected to the CPU 60. Graphic module 500 is coupled to and controlled by the CPU 60. Moreover, mobile phone 100 is provided with a display unit 70 provided with a corresponding screen 71 (e.g., a liquid crystal display, DSPY), and a user interface 50, such as an alphanumeric keyboard (K-B).

The graphic module 500 is configured to perform a set of graphic functions to render an image on the screen 71 of the display 70. In one embodiment, the graphic module 500 is a graphic engine configured to render images, offloading the CPU 60 from performing such tasks. In one embodiment of the present invention the term "graphic engine" means a device which performs rendering in hardware. The terms "graphic accelerator", also employed in the field, is equivalent to the term graphic engine.

Alternatively, the graphic module 500 can be a graphic processing unit (GPU) wherein the rendering functions are performed on the basis of hardware and software instructions. In accordance with a further embodiment, some or all of the rendering functions are performed by the CPU 60.

Figure 2:
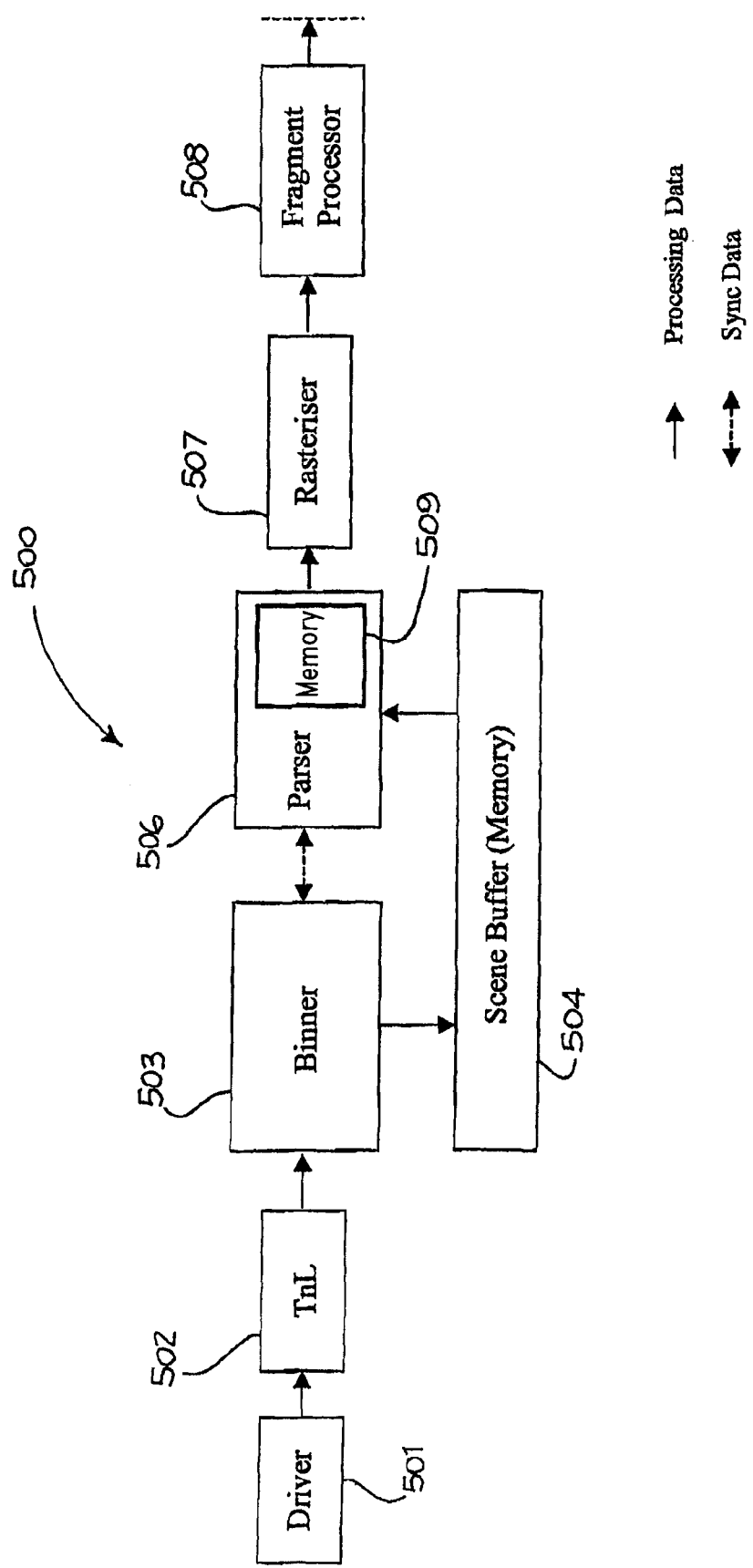
FIG. 2 shows an example of graphic module in accordance with one embodiment of the invention.

In FIG. 2 a diagram of the graphic module 500, is shown by means of functional blocks. Graphic engine 500 can perform the rendering of 3D (three dimensional) scenes that are displayed on the screen 71 of the display 70. Particularly, the graphic engine 500 can operate according to a sort-middle rendering approach (also called "tile based" rendering).

In accordance with the sort-middle rendering, the screen 71 of the display 70 is divided in a plurality of 2D (two dimensional) ordered portions (i.e., 2D tiles) such as, for example, square tiles 5 as shown in FIG. 7. As an example, the screen is divided into 2D tiles having size 16×16 pixels or 64×64 pixels.

The graphic engine 500, illustrated in FIG. 2, comprises a driver 501, a geometry stage 502 (also known as TnL stage—Transform and Lighting stage) a binner stage 503 and a parser stage 506.

The driver 501 is a block having interface tasks and is configured to accept commands from programs (e.g., application protocol interface—API) running on the CPU 60 and then translate them into specialized commands for the other blocks of the graphic engine 500.

The geometry stage 502 is configured to process primitives and apply to them transformations so as to move 3D objects. As defined above, a primitive is a simple geometric entity such as, e.g., a point, a line, a triangle, a square, a polygon or high-order surface. In the following reference will be made to triangles, which can be univocally defined by the coordinates of their vertexes, without other types of employable primitives.

The binner stage 503 is adapted to acquire from the geometry stage 502 primitive coordinates and associate them to each tile of the screen 71. The binner stage 503 is coupled to a scene buffer 504 which is a memory able to store information provided by the binner stage 503. As an example, the scene buffer 504 is a memory external to the graphic module 500 and can be the memory system 80 illustrated in FIG. 1.

The graphic module 500 further includes a parser stage 506, a rasterizer stage 507 and a fragment processor 508 which is coupled to the display 70. The parser stage 506 is responsible for reading, for each tile, the information stored in the scene buffer 504 and passing such information to the following stages also performing a primitive reordering operation.

The parser stage 506 generates an ordered display list which is stored, temporarily, in a parser side memory 509. The parser stage 506 is suitably coupled to the scene buffer memory 504 in order to read its content and is coupled to the binner stage 503 to receive synchronization signals.

According to one embodiment, the parser side memory 509 may be an on-chip memory, which allows a fast processing. As an example, the parser side memory 509 is integrated on the same chip on which the parser stage 506 has been integrated and, e.g., shows a capacity of 8 kB.

The rasterizer stage 507 is configured to perform processing of primitive data received from the parser stage 506 so as to generate pixel information images such as the attribute values of each pixel. The attributes are data (color, coordinates position, texture coordinate etc.) associated to a primitive. As an example, a triangle vertex has the following attributes: color, position, coordinates associated to texture. As is known to the skilled person, a texture is an image (e.g., a bitmap image) that could be mapped on the primitive.

The fragment processor 508 defines fragments from the received pixels, by associating a fragment depth to pixels and other data and performing suitable tests on the received pixels.

Figure 3:
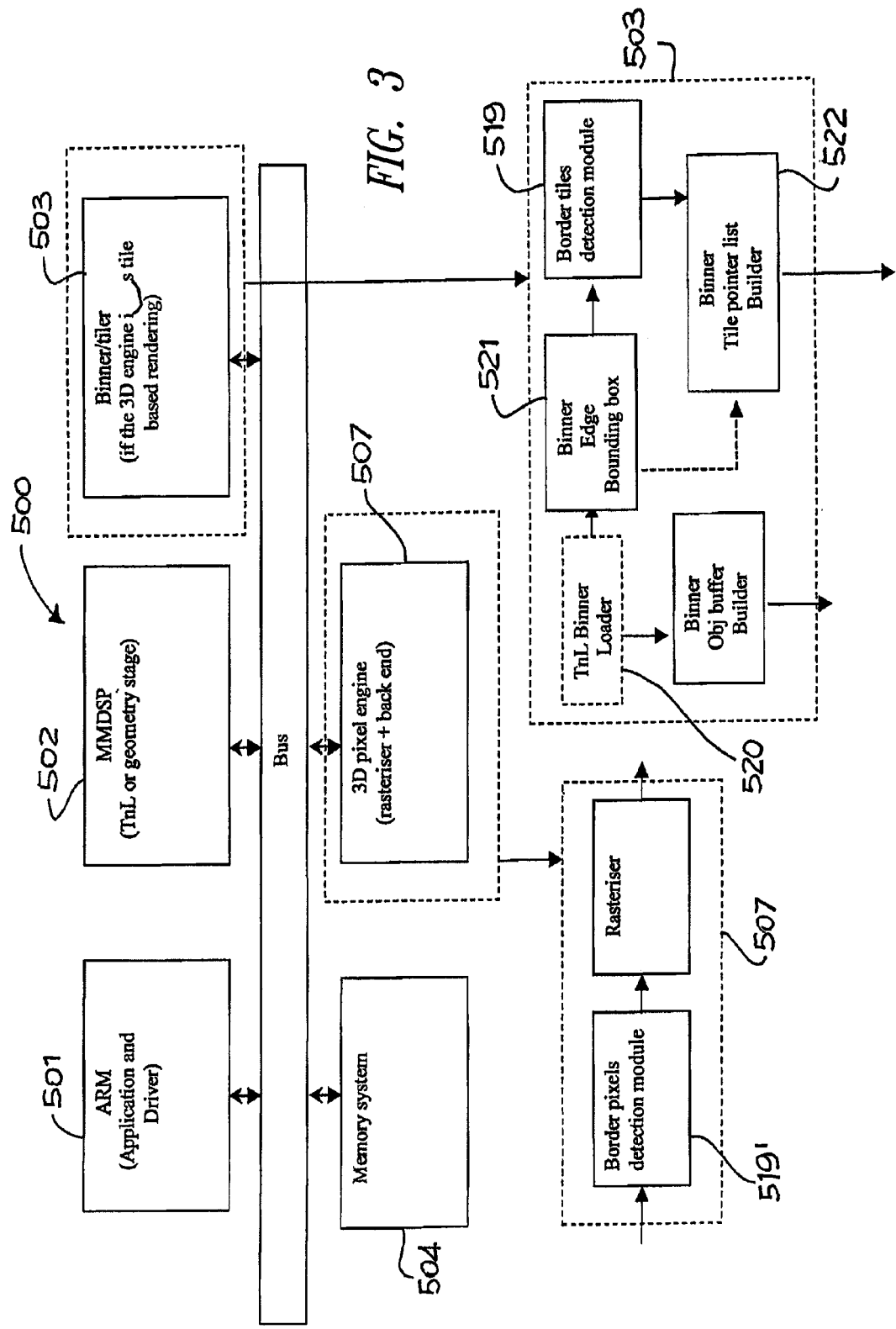
FIG. 3 shows an example of a part of the graphic module in mode detail.

FIG. 3 shows an embodiment of the graphic module 500, wherein the binner module 503 and the rasterizer module 507 are disclosed in more detail. This architectural scheme is developed to work effectively in any 3D hardware (HW) accelerated graphics pipeline. In particular, the module 500 shown in FIG. 3 is oriented towards the integration into the Nomadik Platform (in particular the 8820 version), but it could be easily fitted into any real system that needs an HW accelerated 3D engine. In particular, binner module 503 includes a border tiles detection module 519 suitable to perform a tiles edge detection process which will be described later, a geometry stage loader 520, a binner edge bounding box 521, which creates a bounding box around each primitive as will be described later in more detail, and a tile pointer list builder 522. The tile pointer list builder 522 builds the list of commands for each tile. Such commands can be pointers to contexts (for example, fog enable, blending enable, buffer format, etc.) or pointers to primitives that cross the tiles, detected by the corner/edge detection module 519. Afterwards, the graphic engine will read the sequence of commands of each tile, in order to rasterize the scene tile by tile.

Rasterizer module 507 may include a border pixels detection module 519' suitable to perform a pixels edge detection process according to the method used for the border tiles detection, as will be described later.

Figure 4:
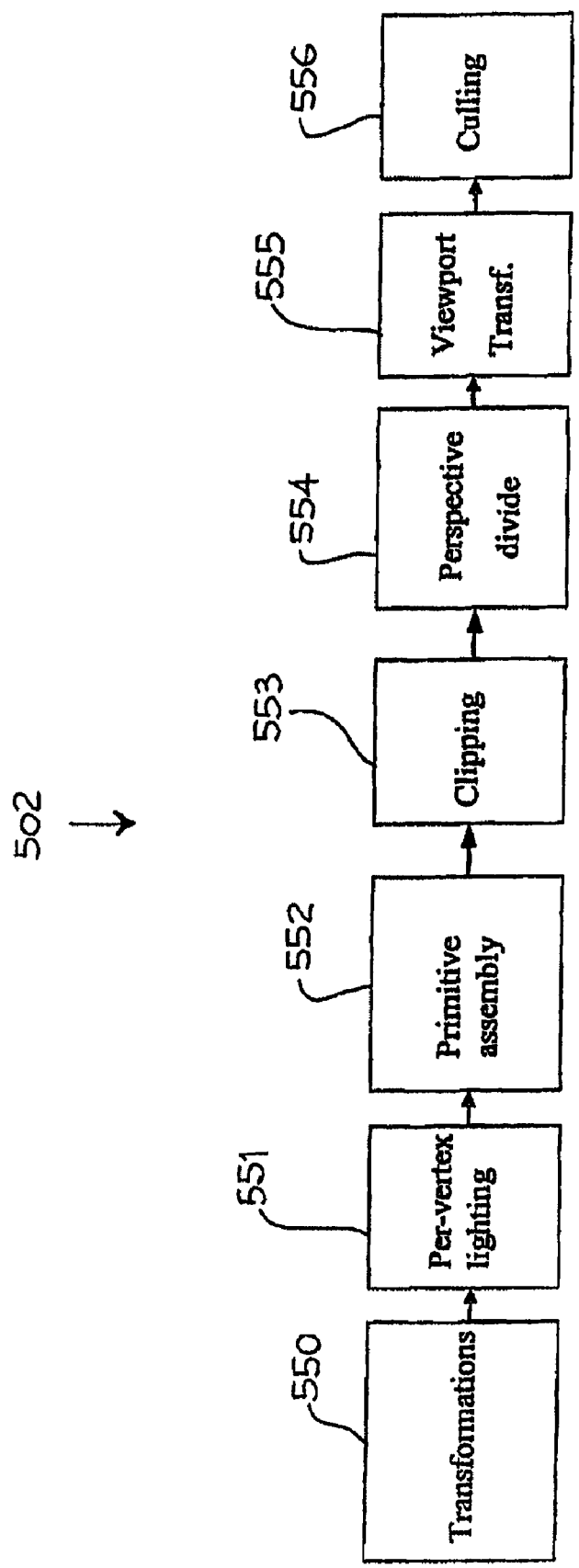
FIG. 4 shows an example of a geometry stage employable in said graphic module.

FIG. 4 shows an embodiment of the geometry stage 502 which includes a transformations stage 550. The transformations stage 550 is configured to apply geometric transformations to vertices of the primitives in each single object of the scene to transform primitives from a user space to a screen space. As an example, transformations are of the affine type and defined in an affine space where two entities are defined: points and vectors. Results of transformation are vectors or points.

Moreover, the particular geometry stage 502 described comprises: a lighting stage 551, a primitive assembly stage 552, a clipping stage 553, a "perspective divide" stage 554, a viewport transformation stage 555 and a culling stage 556.

The per-vertex lighting stage 551 applies light to the primitives depending on a defined light source and suitably adjusts the primitive color vertexes in such a way to define the effect of the light. The primitive assembly stage 552 is a stage that allows reconstruction of the semantic meaning of a primitive so as to specify the primitive type, i.e., specifying if a primitive is a triangle, a line or a point and so on.

The clipping stage 553 allows removal of the primitives that are outside the screen 71 (non-visible primitives) and converting the primitives that are placed partially out of the screen 71 into primitive which are fully visible. The perspective divide stage 554 is adapted to apply a projective transformation dividing each coordinate value by a vector w.

The viewport transformation stage 555 is configured to apply a further coordinates transformation which takes into account the screen resolution. The culling stage 556 has the task of removing the primitives oriented in a direction opposite to the observer and its operation is based on a normal direction associated to each primitive.

In operation, the user of the mobile phone 100 employs the keyboard 50 in order to select a 3D graphic application, such as a video game. As an example, such graphic application allows to show on the screen 71 several scenes. The scenes correspond to what is visible for an observer who can move assuming different positions. Accordingly, a software module corresponding to said graphic application runs on the CPU 60 and activates the graphic module 500.

A 3D scene to be rendered is included in a region of space, called view frustum VF (FIG. 5), which is the observer visible space. In FIG. 5, only a plane portion of the view frustum VF parallel to the screen 71 is shown. The clipping module 503 has the task to find said intersection between the screen 71 and the frustum VF.

The binner stage 503 associates empty tiles with the triangle to avoid redundant rasterizer calculations. It is clear that, if triangles are smaller then tiles, the binner stage 503 processes all triangles within each tile before proceeding to the next tile. If the triangles are larger than tiles, it associates the triangles with all the tiles they cross and stores the state. In this case, an exploration of the tiles is carried out.

According to one embodiment, the binner module 503 is adapted to detect the tiles crossed by the edges of a triangle (border tiles), as described later in more detail. All the tiles between two border tiles on the same row or column are then considered included in the primitive and may therefore be stored. For the sake of clarity, in the following description the storing of the tiles between two border tiles (internal tiles) will be considered carried out by rows. However, as it will appear more clearly from the following description, if the slope of an edge is low, for example <45°, it can be more convenient to perform the border tiles detection in such a way the storage of the internal tiles is carried out by columns.

Figure 6:
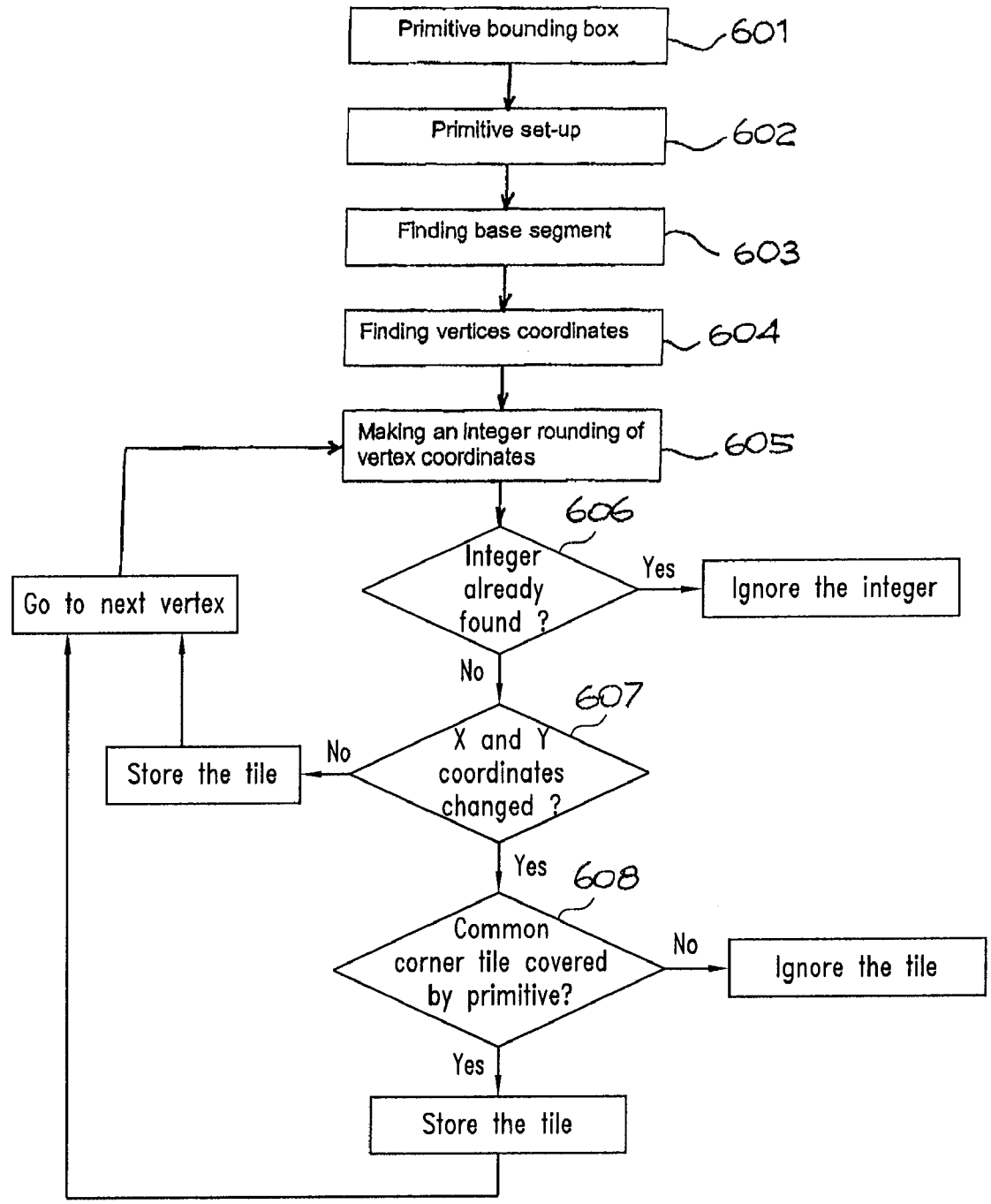
FIG. 6 is a flow chart of the binning method of one embodiment of the invention.

FIG. 6 shows, by means of a flow chart, a method 600 for detecting the border tiles of a primitive defined by at least three vertexes V0=(x0, y0), V1=(x1, y1) and V2=(x2, y2), in accordance with one embodiment of the invention. Particularly, the method can be performed by the binner module 503. In one embodiment, the float values of x,y coordinates of the vertexes of a primitive are scaled with the dimension of the screen in tile units.

Method 600 is directed to detect the tiles covered by a primitive in the form of a triangle 6 defined by three vertexes. It has to be noted, however, that the method here described is also applicable to other polygons, since it is always possible to decompose a polygon in triangles.

According to one embodiment, before starting the exploration of the tiles, the binner module 503 defines, by means of computations, a bounding box 7 around the triangle 6 (step 601 and FIG. 7). Only tiles in the bounding box are candidates as covered tiles for the primitive. Having scaled the vertex coordinates, it is easy to bound because it is sufficient to make a rounding of x, y coordinates into integer coordinates to know the position of a tile. Moreover, the encapsulation of the primitive in the bounding box allows to easily recognize the number of border tiles associated with an edge. For example, the number of border tiles associated with the edge with the maximum deltaY corresponds to the height of the bounding box (i.e., six tiles in the example of FIG. 7).

In a step 602, the binner module 503 performs a primitive set up phase, in which for each couple of vertexes the equation of the line passing through the vertexes is calculated in the form of the following edge equation:

$$E=x(y1-y0)-y(x1-x0)-x0(y1-y0)-y0(x1-x0)=ax+by+c.$$

Any point on the line will satisfy this equation; points not belonging to the line and placed on one side will give a positive result, while points not belonging to the line and placed on the other side will give a negative result. Therefore, the edge equation can be used to determine on which side of a line a point is placed.

The three edge equations of the triangle will be:

$$E0=x(y1-y0)-y(x1-x0)-x0(y1-y0)-y0(x1-x0)=a01x+b01y+c01$$

$$E1=x(y2-y0)-y(x2-x0)-x0(y2-y0)-y0(x2-x0)=a02x+b02y+c02$$

$$E2=x(y1-y2)-y(x1-x2)-x2(y1-y2)-y2(x1-x2)=a21x+b21y+c21$$

In the set up phase, the binner module 503 defines if an edge is left or right and the sign of the slope of each edge.

According to one embodiment of the invention, for determining if an edge is left or right, the binner module 503:
  selects a reference edge between two vertexes;
  tests the sign of the reference edge equation for the third vertex, and:
    if the sign is positive, marks the reference edge as a left edge;
    if the sign is negative, marks the reference edge as a right edge.

As an example shown in FIGS. 8 and 9, the binner module 503 selects as reference edge the edge with the maximum Δy, i.e., the edge showing the maximum value of the difference between the y coordinates of the corresponding vertexes. In this case, the third vertex is a middle vertex, along the y axes. It has to be noted that in the phase of construction of the bounding box the top and bottom values of the y coordinates have already been searched and marked, for example, as indexMaxY and indexMinY. Advantageously, if the values 0, 1 and 2 are associated with the three vertexes, the index of the middle vertex can be calculated with the formula:

indexMiddle=3−indexMaxY−indexMinY.

As stated above, to verify if a point is inside or outside a primitive, the sign of the edge equation may be tested. The line equation could be ax+by+c=0 or −ax−by−c=0, so the sign of the edge equation depends on the sign of the coefficients. According to one embodiment, it is better to have always an internal point with a positive edge equation for all edges, so it is not necessary to change sign of edge equation every time. In other words, the coefficients sign of the edge equation of the left and right edges is chosen such that the results of the edge equations for a point falling between the left and right edges have the same sign.

Then it is sufficient to follow a clockwise direction to define the sign of coefficient.

With reference to FIG. 8, if E0 is the reference edge and V2 the middle vertex, if the corresponding edge equation evaluated for V2 gives a positive result, E0(V2)>0, then the middle vertex is right and the sign of a21, b21, c21 and a02, b02, c02 may be changed to have an internal point with E0, E1, E2 positive.

If E0(V2)<0, then the middle vertex is left and the sign of a01, b01, c01 may be changed to have an internal point with E0, E1, E2 positive (FIG. 9).

A winding equation (cross product between two vectors) gives the same result as the edge equation, so they are equivalent.

According to one embodiment of the invention, the detection of the border tiles associated with an edge of the primitive carried out by the binner module 503 comprises calculating the number k of border tiles covered by the edge. As stated above, since the bounding box is expressed in tile units, such number k of border tiles is immediately given.

Figure 10:
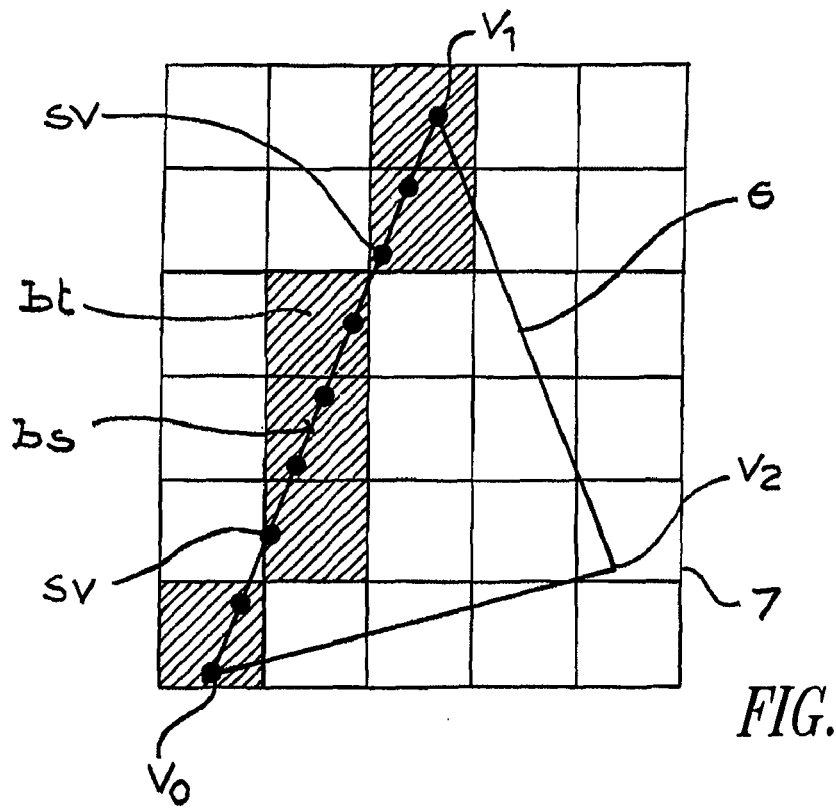
FIG. 10 schematically shows a step of the border tiles detection for an edge of a primitive, according to one embodiment.

In the next step 603, the edge is divided into a plurality of segments of equal length (base segments "bs") (FIG. 10) in such a way that the number of vertices defined by said segments, called sub-vertices "sv" for differentiating from the vertices of the primitive, is greater than or equal to the number of border tiles. In other words, at least one vertex must lie in a border tile "bt" (or in a tile candidate to be a border tile, as explained later).

In step 604, the coordinates of the vertices are calculated and then a tile is associated with the coordinates of each vertex (step 605).

According to one embodiment, the edge is divided using the bisection method, that is, it is divided by a power of two. In particular, the length of the edge is divided by $2^n$, provided that:

$2^n+1 \geq k$, wherein k is the number of border tiles covered by the edge. Therefore, n=rounding by excess of log 2(k−1).

In other words, it is possible to express the whole edge as a multiple of base segment bs. Therefore, the coordinates of the vertices defined by the base segments on the edge are an offset plus bs, 2bs, 3bs, 4bs and so on.

In particular, considering for example the edge connecting V1 to V0, segment bs is composed by bsx and bsy components:

$bsx=(x1-x0)/(2^n)$ $bsy=(y1-y0)/(2^n)$

The X coordinates of all vertices are therefore x0, x0+bsx, x0+2bsx, x0+3bsx, x0+4bsx and so on.
The Y coordinates of all vertices are
y0, y0+bsy, y0+2bsy, y0+3bsy, y0+4bsy and so on.
Or Xnew=Xold+bsx and Ynew=Yold+bsx into incremental shape.

According to one embodiment, associating a tile with the coordinates of each vertex includes making an integer rounding of the vertex coordinates.

Since it is possible that two vertices are in the same tile, some of these roundings could lead to the same tile (step 606). In this case, such a tile is stored only once.

It should be noted that the operation $1/(2^n)$ is simply a shift, so it is not a heavy operation. The operation Log2 could be computationally heavy, but since it is followed by a rounding and the value range is between zero and the maximum number of screen side tiles, it could be implemented with a look up table, which is a simple and fast hardware solution.

Figure 11:
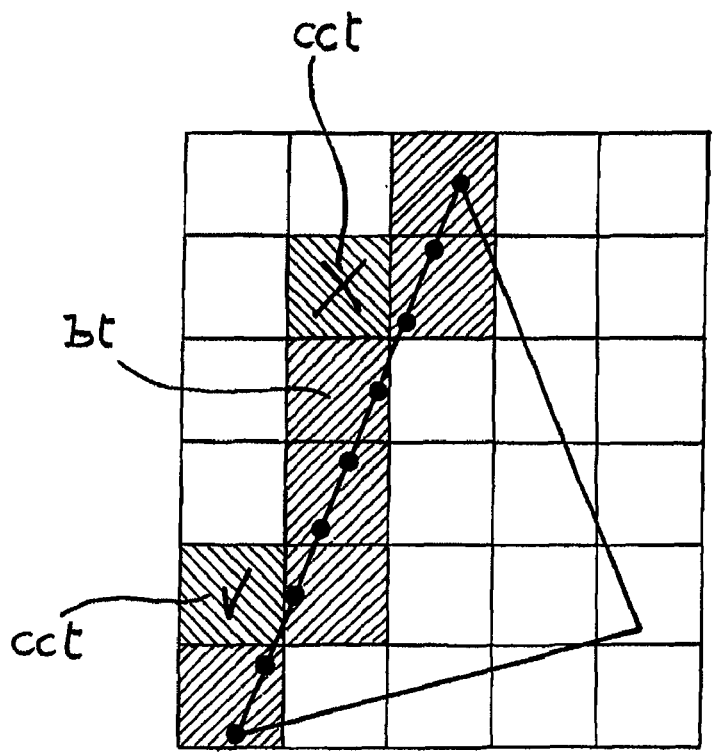
FIG. 11 schematically shows another step of the border tile detection according to one embodiment.
Figure 11A:
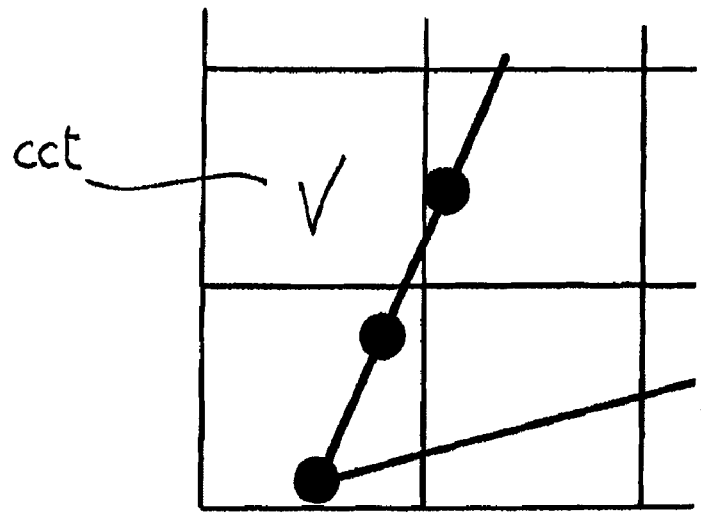
FIGS. 11a and 11b illustrate an enlarged view of diagonal border tiles, in two different situations.
Figure 11B:
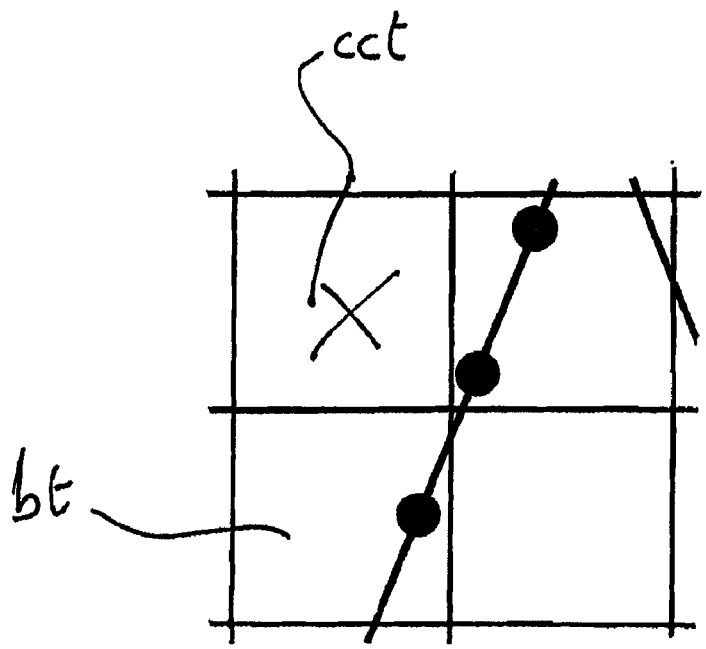

When making an integer rounding of two adjacent vertices, the resulting tiles could be diagonal tiles, that is could have different x and y coordinates (step 607). In this case, according to a preferred embodiment, the binner module 503 checks if the common corner tile "cct" is covered by the primitive or not (step 608; FIGS. 11, 11*a*, 11*b*). In the figures, a common corner tile covered by the primitive is marked with the symbol "v", while a common corner tile not covered is marked with "x". In fact, it could happen that only a corner portion of a tile is crossed by a base segment, without any sub-vertex lying in it. In this case, the effective border tile is not the one associated to the second sub-vertex (which is therefore only a candidate to be a border tile), but is the adjacent one on the external side (marked with "v" in the drawings). In particular, if the edge is a left edge, the border tile is the adjacent tile on the left; if the edge is a right edge, the border tile is the adjacent tile on the right.

According to one embodiment, evaluating if a common corner tile is covered by an edge includes evaluating the sign of the edge equation of said edges for the corner of the common corner tile.

Figure 12:
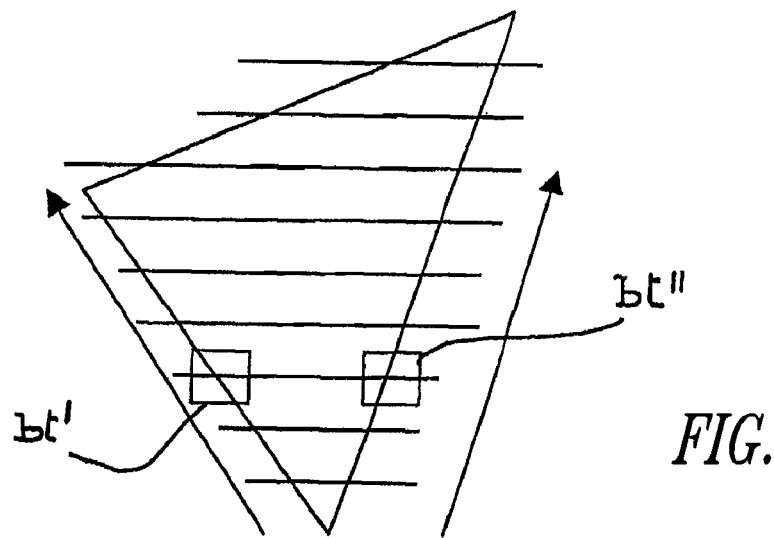
FIG. 12 schematically shows a step of detection of all the tiles covered by a primitive, according to one embodiment.

According to one embodiment, once a left border tile bt' and a right border tile bt" for a row are detected (FIG. 12), all the integers in tile space comprised between the left tile and the right tile are the internal tiles which are stored by the binner module 503 into the scene buffer 504.

According to one embodiment, the explorations of left and right edges are synchronized. In other words, the binner module 503 works on rows and goes to the next row only if the two border tiles are found.

Figure 13:
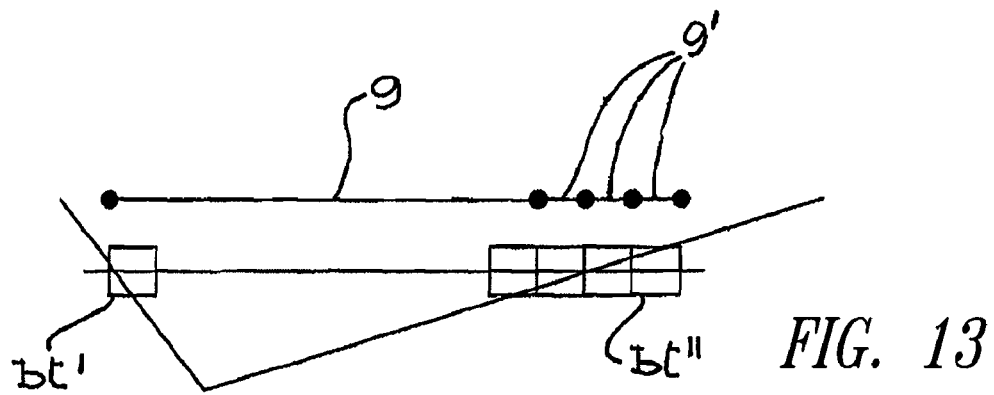
FIG. 13 schematically shows a step of detection of the tiles in a row, according to one embodiment.

In FIG. 13 a case is illustrated in which a right edge has a low slope. In that case, on a same row many tiles are crossed by the edge, but only the last on the right is the border tile bt". According to one embodiment, the binner module 503 operates by rows and it goes to next row only if all border tiles are found. In fact a lot of tiles will be in the same row.

In this case, it is likely to store one long row of tiles 9 and a lot of rows 9' with the same y-coordinate and with one tile dimension.

Figure 14:
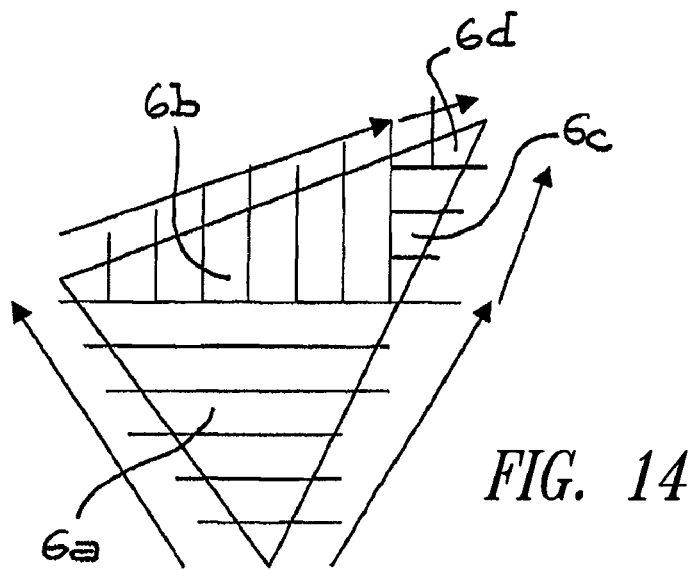
FIG. 14 schematically shows changes in tile exploration direction in the same primitive, according to one embodiment.

In FIG. 14, another approach is diagrammed. According to the slope of the edges, the binner module 503 chooses the exploration direction in such a way to have a left and/or a right edge with a high slope, for example greater than 45°. The exploration direction may be changed many times within the same primitive. In FIG. 14, the triangle 6 is divided in four regions 6*a*-6*d*, with which four directions of exploration are associated. It should be noted that in this case, advantageously, the binner module 503 can work in parallel on more rows or columns.

Figure 15:
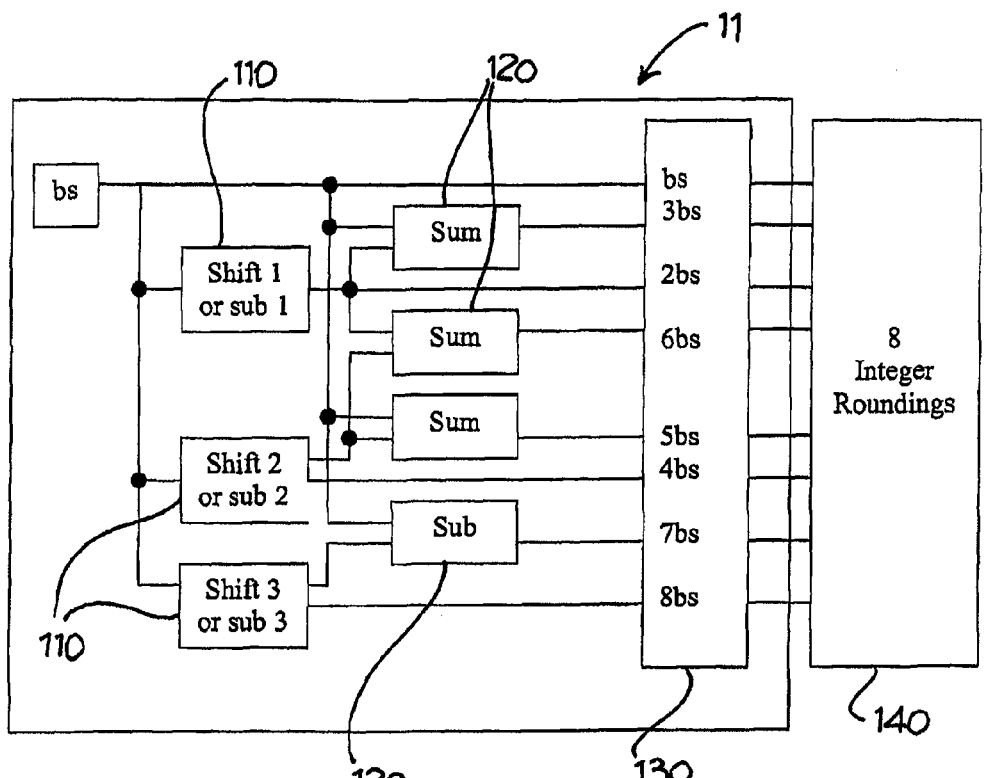
FIG. 15 schematically shows an electronic circuit for calculating the coordinates of border tiles of an edge.

FIG. 15 shows a diagram of a possible hardware circuit 11 for generating in parallel the sub-vertices of an edge and performing the rounding for an input value corresponding to a basic segment bs. The circuit allows to find many border tiles in one pass. As an example, the illustrated circuit calculates base segment bs, 2bs, 3bs, etc., until 8bs.

A first set of shift circuit blocks 110 performs three shifts (if the input value is fixed) or subtractions on the exponent value (if the input value is floating).

A second set of sum circuit blocks 120 performs four sums in order to obtain the eight values bs, 2bs, . . . , 8bs that are stored in one or more registers or other storage blocks 130.

Finally, the circuit includes a rounding circuit 140 that performs the eight integer roundings for the example edge $V_0$, $V_1$ discussed above.

Figure 16:
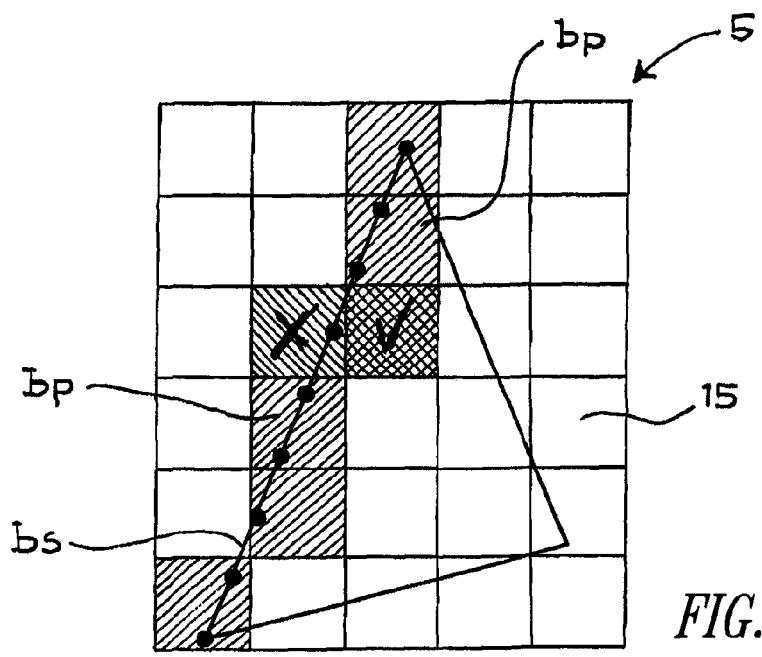
FIG. 16 schematically shows a step of a method for detecting border pixels in a tile, according to one embodiment.

According to one embodiment, the binning method used by binner module 503 for associating tiles with a primitive can be applied also by the rasterizer module 507 for finding the pixels 15, in particular border pixels "bp", associated with a current tile 5 (FIG. 16).

Advantageously, it is possible to reuse the base segment bs calculated for tiles also for border pixels. In fact, if, for example, each tile is made of 16×16 pixels, then bsPixel=bsTile/16. However, bstile is defined into tile space; to redefine bstile into pixel space it would be necessary to multiple it by 16: bsPixel=bsTile*16.

At the end, therefore, bsPixel=bstile=bs, and no extra operations are required.

Hence, according to one embodiment, the rounding of the sub-vertices coordinates calculated for finding the border tiles, also gives the border pixel coordinates bp within a tile 5, or better, as explained hereinafter, the coordinates of border pixel candidates.

As in the case of the tiles, the rounding of two adjacent sub-vertices could give the same pixel; in this case the second sub-vertex is ignored.

According to one embodiment, a pixel 15 is considered a border pixel bp, therefore a pixel to be rendered, if its center is within the primitive.

Therefore, once a border pixel candidate is found, the rasterizer module 507 checks if the pixel is inside the primitive or not. If the pixel is outside the primitive, the right pixel is the adjacent on the internal side.

According to one embodiment, such a check is performed by testing the sign of the edge equation in the pixel center. For example, the edge equation for the left edge V0-V1 in screen space is $$E=x(y1-y0)-y(x1-x0)-x0(y1-y0)+y0(x1-x0)$$

Advantageously, the coefficients of the edge equation have already been calculated and saved in the binner set up phase. Therefore, they are free.

Besides, it is possible to use an incremental edge equation, because the next pixel could have deltax=0 and deltay=−1 or deltax=−1 and deltay=−1 (for left edge).

Hence, edge equation becomes:

$$E=E\text{old}+(x1-x0)$$

or $$E=E\text{old}-(y1-y0)+(x1-x0)$$

Therefore, only one or two sums are required.

It should be noted that also the selection of left or right edge and of the sign of edge are free, because they come from the set up phase of the binning process.

For these reasons, the method is particularly advantageous when used both for tiles and pixels, because it is possible to reuse a lot of parts.

Figure 17:
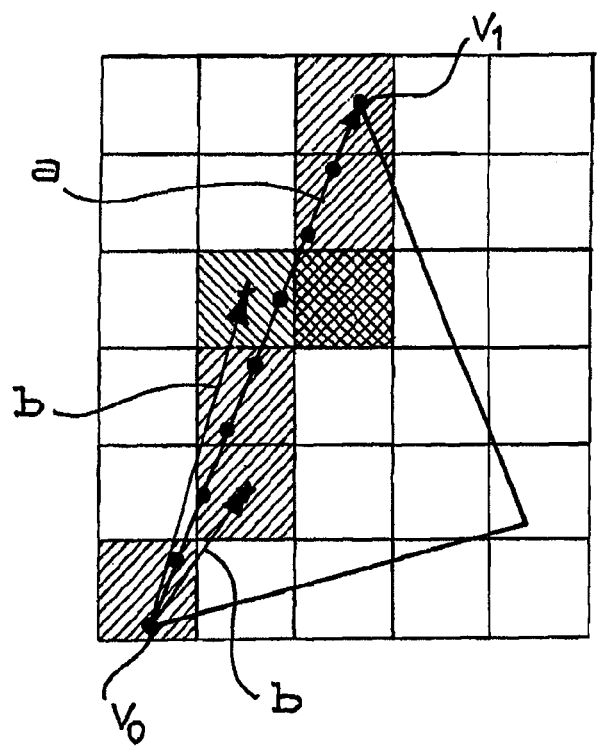
FIG. 17 schematically shows a step of a method for detecting border pixels in a tile, according to another embodiment.

According to another embodiment, checking if the pixel center is inside the primitive comprises testing the sign of the winding equation, or cross product, between the vector a defined by the edge and the vector b originating from the edge starting point and reaching the pixel center (FIG. 17).

For example, the winding equation is:

$$\text{Wind}=\text{Delta}X*(Y\text{corner}-Y\text{start})-(X\text{corner}-X\text{start})*\text{Delta}Y$$

where DeltaX and DeltaY are the components of the edge.

Advantageously, these components have already been calculated to make the bounding box on the edge in binner phase, so they are free.

Also in this case, it is possible to express the winding equation in incremental form:

$$\text{Wind}=\text{Wind old}+\text{Delta}X$$

Or $$\text{Wind}=\text{Wind old}-\text{Delta}Y+\text{Delta}X.$$

Only one or two sums are employed According to one embodiment, for testing if the edge is left or right in set up phase, it is sufficient to make again the winding equation applied on the vertex out of triangle edge (V2):

$$\text{Wind}=\text{Delta}X*(Y\text{out}-Y\text{start})-(X\text{out}-X\text{start})*\text{Delta}Y.$$

However, also in this case this test is not necessary because this information comes from the set up phase of the binning method.

According to one embodiment, once a left border pixel and a right border pixel for a row are detected, all the integers in pixel space comprised between the left pixel and the right pixel are the internal pixel which are rendered by the rasterizer module 507.

According to one embodiment, the exploration of left and of a right edge is synchronized. In other words, the rasterizer module 507 works on rows and goes to the next row only if the two border pixels are found.

The considerations made above, with reference to FIGS. 13 and 14, for the tiles case about the choice of the exploration direction according to the slope of the edges, are valid also for the pixel case.

Figure 18:
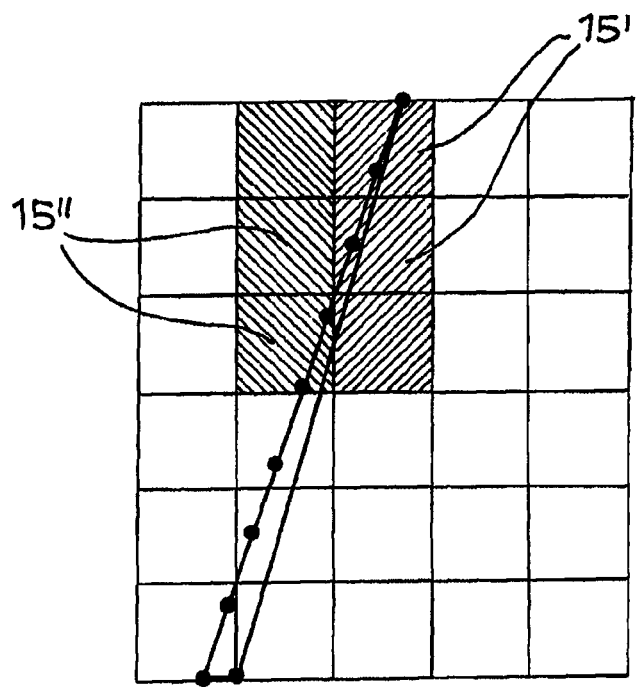
FIG. 18 shows the case of a thin triangle.

It should be noted that some triangles could be very thin, such that they go through the pixel without covering the pixel center (FIG. 18).

The method allows recognizing easily that case, because, after having performed the test on the pixel center, it results that the left start pixel 15' is greater (for example has a greater x-coordinate) than end right pixel 15". Since this is not possible, any pixel is correctly selected for that row.

It should be noted that the method phase related to the testing of the position of the pixel center compared to the primitive, could be applied in the same way to other points of the pixel, for example to the center of a quarter of pixel for finding border pixels for edge antialiasing.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting border tiles of a primitive using a graphics processor that includes at least one of a hardware graphic engine, a graphic processing unit, and a CPU, the detecting including:
   calculating the number of border tiles covered by an edge of the primitive;
   identifying a plurality of vertices that divide the edge in a plurality of segments of equal length, the number of vertices being greater than or equal to the number of border tiles;
   calculating coordinates of said vertices; and
   associating a tile with the coordinates of each vertex.

2. The method according to claim 1, wherein the identifying step includes dividing a length of the edge by $2^n$, provided that:

$$2^n+1 \geq k,$$

wherein k is the number of border tiles covered by the edge, and therefore n=rounding by excess of $\log_2(k-1)$.

3. The method according to claim 1, wherein associating a tile with the coordinates of each vertex includes making an integer rounding of the vertex coordinates.

4. The method according to claim 1, further comprising:
   detecting that two diagonal tiles that share a common corner are border tiles covered by an edge of the primitive; and
   evaluating whether an additional tile that shares the common corner is a border tile that is covered by the edge.

5. The method according to claim 1, comprising:
   defining a left edge and a right edge of the primitive compared to a direction of exploring tiles;
   detecting that two diagonal tiles that share a common corner are border tiles covered by one of the edges of the primitive;
   if the edge covering the diagonal tiles is the left edge, evaluating whether a left common corner tile, having a lower-right corner that is the common corner, is covered by the left edge;
   if the edge covering the diagonal tiles is the right edge, evaluating whether a right common corner tile, having a lower-left corner that is the common corner, is covered by the right edge.

6. The method according to claim 5, wherein:
   evaluating whether the left common corner tile is covered by the left edge comprises evaluating an edge equation of said left edge with respect to the common corner; and
   evaluating whether the right common corner tile is covered by the right edge comprises evaluating an edge equation of said right edge with respect to the common corner.

7. The method according to claim 5, wherein defining the left edge and the right edge comprises:
   selecting a reference edge extending between two vertexes;
   testing a sign of a reference edge equation for a third vertex, such that:
   if the sign of the reference edge equation is positive, then the reference edge is the left edge;
   if the sign of the reference edge equation is negative, then the reference edge is the right edge.

8. The method according to claim 1, wherein calculating the number of border tiles covered by the edge of the primitive comprises determining a bounding box for the edge by rounding vertices of the edge and counting tiles in the bounding box for the edge.

9. The method according to claim 1, comprising:
   defining a left edge and a right edge of the primitive;
   performing the detecting for said left and right edges to obtain left border tiles for the left edge and right border tiles for the right edge;
   finding internal tiles or pixels comprised between the left border tiles or pixels and the right border tiles.

10. The method according to claim 9, wherein the internal tiles are all integers, in tile space, comprised between the left border tiles and the right border tiles.

11. The method according to claim 10, wherein detecting the left border tiles and detecting the right border tiles are synchronized.

12. The method according to claim 1, wherein the primitive is one of a plurality of primitives that are triangles, which each define a frame of three-dimensional data; and the defining is performed for each triangle; the method further comprising assigning each triangle to tiles in a memory buffer.

13. The method according to claim 12, comprising:
    moving 3D objects by processing the triangles and applying transformations to the triangles.

14. The method according to claim 13, wherein processing step comprises:
    applying geometric transformations to vertices of the triangles in each single object of a scene to transform triangles from a user space to a screen space;
    applying light to the triangles depending on a defined light source and suitably adjusting colors of the vertices to define the effect of the light;
    specifying if a primitive is a triangle, a line or a point;
    removing primitives that are outside the screen space and converting primitives that are placed partially out of the screen space into primitives which are fully visible;
    applying a projective transformation dividing each coordinate value by a vector;
    applying a coordinates transformation which takes into account a screen resolution; and
    removing primitives oriented in a direction opposite to an observer.

15. The method according to claim 12, further comprising:
    reading, for each tile, information associated with the tile, and performing a primitive reordering operation and passing the information to:
    a rasterizer stage arranged downstream of a parser stage for processing primitive data received from the parser stage so as to generate pixel information images; and
    a fragment processing stage arranged downstream the rasterizer stage for defining fragments from received pixels, by associating a fragment depth with pixels and other data and performing suitable tests on the received pixels.

16. A binner module, comprising:
    detecting means for detecting border tiles of a primitive, the detecting means including:
    first calculating means for calculating the number of border tiles covered by an edge of the primitive;

identifying means for identifying a plurality of vertices that divide the edge in a plurality of segments of equal length, the number of vertices being greater than or equal to the number of border tiles;
second calculating means for calculating coordinates of said vertices; and
associating means for associating a tile with the coordinates of each vertex.

17. The binner module according to claim 16, wherein the identifying means includes means for dividing a length of the edge by $2^n$, provided that:

$$2^n+1 \geq k,$$

wherein k is the number of border tiles covered by the edge, and therefore n=rounding by excess of $\log_2(k-1)$.

18. The binner module according to claim 16, further comprising:
means for detecting that two diagonal tiles that share a common corner are border tiles covered by an edge of the primitive; and
means for evaluating whether an additional tile that shares the common corner is a border tile that is covered by the edge.

19. The binner module according to claim 16, comprising:
defining a left edge and a right edge of the primitive;
performing the detecting for said left and right edges to obtain left border tiles for the left edge and right border tiles for the right edge;
finding internal tiles or pixels comprised between the left border tiles or pixels and the right border tiles.

20. A graphic module, comprising:
a geometry stage structured to process a primitive representing a model of an object to be displayed on a screen; and
a binner module arranged downstream of said geometry stage and suitable for acquiring from the geometry stage primitive coordinates and associating the primitive coordinates to tiles of the screen, the binner module including: detecting means for detecting border tiles of a primitive, the detecting means including:
first calculating means for calculating the number of border tiles covered by an edge of the primitive;
identifying means for identifying a plurality of vertices that divide the edge in a plurality of segments of equal length, the number of vertices being greater than or equal to the number of border tiles;
second calculating means for calculating coordinates of said vertices; and
associating means for associating a tile with the coordinates of each vertex.

21. The graphic module according to claim 20, wherein the binner module is structured to receive from the geometry stage three vertexes of a triangle representing the primitive, define a left edge and a right edge of the primitive with respect to a tiles exploration direction, and calculate edge equations for said left and right edges, in such a way to define slope signs of the left and right edges.

22. The graphic module according to claim 20, wherein the binner module is configured for storing in a memory buffer all tiles between border tiles discovered for a left and a right edge of a primitive.

23. A system, comprising:
a display screen; and
a graphic module that includes:
a geometry stage structured to process a primitive representing a model of an object to be displayed on the display screen; and
a binner module arranged downstream of said geometry stage and suitable for acquiring from the geometry stage primitive coordinates and associating the primitive coordinates to tiles of the screen, the binner module including: detecting means for detecting border tiles of a primitive, the detecting means including:
first calculating means for calculating the number of border tiles covered by an edge of the primitive;
identifying means for identifying a plurality of vertices that divide the edge in a plurality of segments of equal length, the number of vertices being greater than or equal to the number of border tiles;
second calculating means for calculating coordinates of said vertices; and
associating means for associating a tile with the coordinates of each vertex.

24. The system according to claim 23, wherein the binner module is structured to receive from the geometry stage three vertexes of a triangle representing the primitive, define a left edge and a right edge of the primitive with respect to a tiles exploration direction, and calculate edge equations for said left and right edges, in such a way to define slope signs of the left and right edges.

25. The system according to claim 23, wherein the binner module is configured for storing in a memory buffer all tiles between border tiles discovered for a left and a right edge of a primitive.

26. A method, comprising:
detecting border pixels of a primitive using a graphics processor that includes at least one of a hardware graphic engine, a graphic processing unit, and a CPU, the detecting including:
calculating the number of border pixels covered by an edge of the primitive;
identifying a plurality of vertices that divide the edge in a plurality of segments of equal length, the number of vertices being greater than or equal to the number of border pixels;
calculating coordinates of said vertices; and
associating a pixel with the coordinates of each vertex.

27. The method according to claim 26, further comprising, for each pixel detected, checking if a center of the pixel is inside the primitive.

28. The method according to claim 27, wherein, for each pixel detected, if the center of the pixel is outside the primitive, identifying as one of the border pixels an adjacent pixel that is immediately adjacent to the pixel and inside the primitive.

29. The method according to claim 27, wherein checking if the center of the pixel is inside the primitive comprises testing a sign of an edge equation in the pixel center.

30. The method according to claim 27, wherein checking if the pixel center is inside the primitive comprises testing a sign of a cross product between a vector defined by the edge and a vector originating from a starting point of the edge and reaching the pixel center.

31. The method according to claim 26, wherein the detecting includes:
obtaining a plurality of equally spaced sub-points on an edge of the primitive, in such a way at least a sub-point lies in a pixel candidate to be a border pixel;
associating a pixel with the coordinates of each sub-point; and
for each pixel detected, checking if the pixel center is inside the primitive.

32. The method according to claim 31, wherein the sub-points are the vertices found by detecting border pixels.

33. A rasterizer module, comprising:
- detecting means for detecting border pixels of a primitive, the detecting means including:
- first calculating means for calculating the number of border pixels covered by an edge of the primitive;
- identifying means for identifying a plurality of vertices that divide the edge in a plurality of segments of equal length, the number of vertices being greater than or equal to the number of border pixels;
- second calculating means for calculating coordinates of said vertices; and
- associating means for associating a pixel with the coordinates of each vertex.

34. The rasterizer module according to claim 33, further comprising means for checking, for each pixel detected, if a center of the pixel is inside the primitive.

35. The rasterizer module according to claim 33, wherein the detecting means includes:
- means for obtaining a plurality of equally spaced sub-points on an edge of the primitive, in such a way at least a sub-point lies in a pixel candidate to be a border pixel;
- means for associating a pixel with the coordinates of each sub-point; and
- mean for checking, for each pixel detected, if the pixel center is inside the primitive.

36. A graphic module, comprising:
- a geometry stage structured to process a primitive representing a model of an object to be displayed on a screen; and
- a rasterizer module arranged downstream of said geometry stage and suitable for acquiring from the geometry stage primitive coordinates and associating the primitive coordinates to pixels of the screen, the rasterizer module including: detecting means for detecting border pixels of a primitive, the detecting means including:
- first calculating means for calculating the number of border pixels covered by an edge of the primitive;
- identifying means for identifying a plurality of vertices that divide the edge in a plurality of segments of equal length, the number of vertices being greater than or equal to the number of border pixels;
- second calculating means for calculating coordinates of said vertices; and
- associating means for associating a pixels with the coordinates of each vertex.

37. A system, comprising:
- a display screen; and
- a graphic module that includes:
- a geometry stage structured to process a primitive representing a model of an object to be displayed on a screen; and
- a rasterizer module arranged downstream of said geometry stage and suitable for acquiring from the geometry stage primitive coordinates and associating the primitive coordinates to pixels of the screen, the rasterizer module including: detecting means for detecting border pixels of a primitive, the detecting means including:
- first calculating means for calculating the number of border pixels covered by an edge of the primitive;
- identifying means for identifying a plurality of vertices that divide the edge in a plurality of segments of equal length, the number of vertices being greater than or equal to the number of border pixels;
- second calculating means for calculating coordinates of said vertices; and
- associating means for associating a pixels with the coordinates of each vertex.

38. The system according to claim 37, wherein the rasterizing module includes means for checking, for each pixel detected, if a center of the pixel is inside the primitive.

39. The system according to claim 37, wherein the detecting means includes:
- means for obtaining a plurality of equally spaced sub-points on an edge of the primitive, in such a way at least a sub-point lies in a pixel candidate to be a border pixel;
- means for associating a pixel with the coordinates of each sub-point; and
- mean for checking, for each pixel detected, if the pixel center is inside the primitive.

40. The graphic module according to claim 36, wherein the rasterizing module includes means for checking, for each pixel detected, if a center of the pixel is inside the primitive.

41. The graphic module according to claim 36, wherein the detecting means includes:
- means for obtaining a plurality of equally spaced sub-points on an edge of the primitive, in such a way at least a sub-point lies in a pixel candidate to be a border pixel;
- means for associating a pixel with the coordinates of each sub-point; and
- mean for checking, for each pixel detected, if the pixel center is inside the primitive.

\* \* \* \* \*